United States Patent [19]

Bolon et al.

[11] Patent Number: 5,104,958
[45] Date of Patent: Apr. 14, 1992

[54] SOLVENT RESISTANT SILICONE POLYIMIDES

[75] Inventors: Donald A. Bolon, Charlton; Patricia C. Irwin, Schenectady, both of N.Y.

[73] Assignee: General Electric Company, Schenectady, N.Y.

[21] Appl. No.: 645,929

[22] Filed: Jan. 25, 1991

[51] Int. Cl.$^5$ ............................................. C08G 77/04
[52] U.S. Cl. ........................................ 528/26; 528/28; 528/41
[58] Field of Search ............................. 528/26, 28, 41

[56] References Cited

U.S. PATENT DOCUMENTS

| | | | |
|---|---|---|---|
| 4,716,216 | 12/1987 | Takekoshi et al. | 528/126 |
| 4,795,680 | 1/1989 | Rich et al. | 428/450 |
| 4,808,686 | 2/1989 | Cella et al. | 528/26 |
| 4,826,916 | 5/1989 | Policastro et al. | 528/26 |

Primary Examiner—John C. Bleutge
Assistant Examiner—Margaret W. Glass
Attorney, Agent, or Firm—William A. Teoli; James C. Davis, Jr.; William H. Pittman

[57] ABSTRACT

Silicone polyimides resulting from the condensation of para phenylene diamine and an organic dianhydride mixture of a bis(phthalic anhydride)poly(diorganosiloxane), a 2,2 bis[4-(3,4-dicarboxyphenoxy)phenyl] propane dianhydride and hydroquinone dianhydride in a dipolar aprotic solvent have been found to be substantially insoluble in chlorinated organic solvents such as chloroform and useful as melt extrudable wire coating compositions.

5 Claims, No Drawings

SOLVENT RESISTANT SILICONE POLYIMIDES

BACKGROUND OF THE INVENTION

The present invention relates to silicone polyimides which are substantially insoluble in chlorinated organic solvents and which are useful as melt extrudable wire coating compositions.

Prior to the present invention, as shown by Rich et al, U.S. Pat. No. 4,795,680, incorporated herein by reference and assigned to the same assignee as the present invention, polyimide siloxanes were provided resulting from the condensation of organic diamines and organosiloxanes having terminal silyl substituted aromatic organic anhydride groups. For example, there are included by the polyimide siloxanes of Rich et al, silicone polyimides resulting from the reaction of organic diamines and aromatic anhydride terminated organopolysiloxanes of the formula,

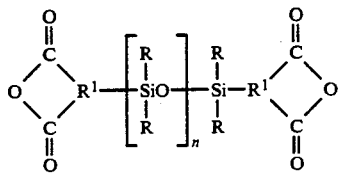

hereinafter referred to as "PADS", where R is a $C_{(1-14)}$ monovalent hydrocarbon radical, or a $C_{(1-14)}$ monovalent hydrocarbon radical substituted with the same or different radicals inert during intercondensation, $R^1$ is a $C_{(6-14)}$ trivalent aromatic organic radical, and n is an integer equal to 1 to about 2000 inclusive.

Although silicone polyimides made from PADS of U.S. Pat. No. 4,795,680 are useful as insulation for electrical conductors, coatings and numerous other applications, flame retardant wire coating compositions having improved solvent resistance are constantly being evaluated by manufacturers of wire coating materials.

SUMMARY OF THE INVENTION

The present invention is based on the discovery that silicone polyimides resulting from the condensation of para phenylene diamine and a substantially equal molar amount of organic dianhydride in the form of a mixture of PADS, 2,2 bis[4-(3,4-dicarboxyphenoxy)phenyl] propane dianhydride(BPADA) and hydroquinone dianhydride (HQDA)

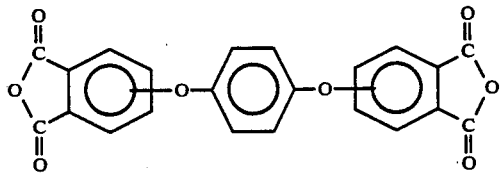

and processed in a dipolar aprotic solvent, such as N-methylpyrrolidone have been found to be substantially insoluble in chlorinated organic solvents, such as chloroform. In addition to possessing superior solvent resistance, the silicone polyimides of the present invention also have been found to be melt extrudable and flame retardant.

STATEMENT OF THE INVENTION

There is provided by the present invention, melt extrudable silicone polyimides which are substantially insoluble in chlorinated organic solvents and which have a melt flow rate of less than about 40 mg/min in accordance with ASTMD-1238-79, comprising the condensation reaction product in a dipolar aprotic solvent of substantially equal molar amounts of para phenylene diamine and an organic dianhydride mixture consisting essentially of about (a) 40–60 mole % of PADS,
(b) 10–50 mole % of HQDA,
(c) 10–50 mole % of BPADA based on the total moles of organic dianhydride in the mixture of (a), (b), (c).

Radicals included within R of formula 1 are for example $C_{(1-8)}$ alkyl radicals and halogenated alkyl radicals such as, methyl, ethyl, propyl, butyl, octyl, trifluoropropyl, etc.; alkenyl radicals for example, vinyl, allyl, cyclohexenyl, etc.; aryl radicals, alkaryl radicals, alkoxyaryl radicals, and haloaryl radicals, for example, phenyl, ethylphenyl, chlorophenyl, methoxyphenyl tolyl, xylyl, biphenyl, naphthyl, etc. Radicals included within $R^1$ of formula 1, are for example,

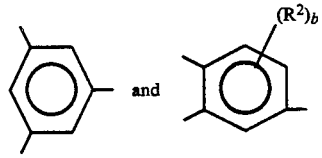

where $R^2$ is selected from monovalent neutral radicals such as R, halo, and $C_{(1-8)}$ alkoxy, and b is an integer having a value of from 1 to 3 inclusive.

The silicone polyimides of the present invention can be synthesized by effecting reaction at temperatures in the range of from about 150° C. to 350° C., in a dipolar aprotic solvent, between substantial equal molar amounts of para phenylene diamine and organic dianhydride in the form of a mixture of PADS, BPADA and HQDA. Preferably, n in formula 1 has a value of from about 7 to 30. Methods for making PADS having variable polydiorganosiloxane block sizes involve the equilibration of the corresponding bis(phthalic anhydride) tetraorganodisiloxane, such as 1,3-bis(4'-phthalic anhydride) tetramethyldisiloxane with cyclopolysiloxane, such as hexamethylcyclotrisiloxane or octamethylcyclotetrasiloxane in the presence of a conventional equilibration catalyst, such as sulfuric acid.

In order that those skilled in the art will be better able to practice the present invention the following example is given by way of illustration and not by way of limitation. All parts are by weight unless specified otherwise.

EXAMPLE 1

A mixture of 5 grams of 1,3-bis(4'-phthalic anhydride)tetramethyldisiloxane and 20.84 grams of octamethylcyclotetrasiloxane in 50 ml of orthodichlorobenzene containing 0.5 ml of fuming sulfuric acid and 1.0 ml of concentrated sulfuric acid was agitated to a 110° C. temperature for 18 hours. The mixture was allowed to cool to room temperature and 100 ml of methylene chloride was added An excess of sodium bicarbonate also was introduced to neutralize the acid. The solution was filtered with decolorizing carbon and the solvent removed in vacuo. The product was then heated to 80° C. at 0.01 torr to remove any volatile products. There was obtained a clear viscous oil which was a polydimethylsiloxane having an average of about 16 chemically combined dimethylsiloxy units with terminal phthalic dimethylsiloxy anhydride units. Based on method of preparation and proton NMR and IR analysis, the PADS had the following formula,

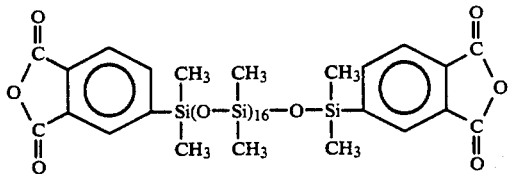

Following the above procedure, additional PADS was prepared where n in formula (1) varied between 10 through 21.

A mixture of 30 ml of ortho dichlorobenzene (ODCB) and 2.62 g of para phenylene diamine was heated to 100° C. in a nitrogen atmosphere. There was added to the mixture, 21.9 g of PADS in the form of a polydimethylsiloxane having an average of 19.9 condensed dimethylsiloxy units, and terminal dimethylsiloxy phthalic anhydride units, 2.4 g of hydroquinone dianhydride (HQDA), 3.12 g 2,2 bis[4-(3,4-dicarboxyphenoxy)phenyl] propane dianhydride (BPADA), 0.036 g phthalic anhydride, 0.122 g dimethylamino pyridine (DMAP) and 150 ml ODCB. The mixture was heated to 185° C. A stream of nitrogen helped carry the azeotroped water—ODCB to an attached trap. Most of the water was removed in about 1 hour and the mixture was heated an additional 7-8 hours. During which time substantial polymer precipitated out. The mixture was cooled to 70° C., and 170 ml of chloroform was added. The mixture was then cooled to room temperature. The resulting slurry was poured into methanol, the polymer filtered, reslurried in chloroform (300 ml) and then heated to reflux. The slurry was then poured into 2 L of methanol, the polymer filtered and dried in vacuum at 70° C., giving 25 g of tan powder.

The above procedure was repeated, except that additional silicone polyimide terpolymers were prepared using substantially equal molar amounts of para phenylene diamine, and an organic dianhydride mixture of 50 mole percent PADS, and various amounts of BPADA, and HQDA, as shown as follows, where DxPADS means the number of diorganosiloxy units in the diorganosiloxane block and control means a silicone compolymer made from para phenylene diamine and an equal molar mixture of PADS and BPADA:

TABLE 1

| | TERPOLYMERS MADE IN ODCB* | | | |
|---|---|---|---|---|
| DxPADS x = | PADS-BPADA-HQDA Compositions | Sol in CHCl₃ | Melt Flow mg/min | IV |
| 10 | Control | Yes | 43 | 1.8 |
| 10 | 50-40-10 | No | 531 | |
| 10 | 50-25-25 | No | | |
| 21 | 50-25-25 | No | 1990 | |
| 20 | 50-40-10 | No | 5370 | |

*All Runs contain 1% phthalic anhydride as chain stopper
The values under Melt Flow indicate that the terpolymer has a relatively low M.W.

EXAMPLE 2

A mixture of 3.86 g of HQDA and 30 ml of N-methylpyrrolidone (NMP) was heated to 70° C. There was added to the mixture, 2.62 g of para phenylene diamine in 50 ml of N-methylpyrrolidone (NMP) followed by 21.9 g of PADS of example 1, 1.25 g of BPADA, 0.036 g phthalic anhydride and 0.122 g of dimethylaminopyridine in 150 ml of NMP. The reaction was heated to 190° C. and with the help of a stream of nitrogen, about 130 ml of NMP was distilled, along with water. The mixture was further heated to 190° C. for 1-2 hours. The reaction product remained in solution as the reaction was cooled to 80° C. then held there 8 hours. The mixture was cooled to room temperature, diluted with 120 ml additional NMP, then added to 2 L of methanol. A terpolymer precipitated and it was redissolved in 150 ml of warm NMP and reprecipitated into 2 L methanol. The terpolymer was filtered and dried under vacuum at 60° C. for 16 hours.

Additional terpolymers were prepared following the same procedure. The following results show the solubility and flow characteristics as some of these terpolymers made in NMP along with a control having the same compositions as example 1:

TABLE 2

| | TERPOLYMERS MADE IN NMP | | |
|---|---|---|---|
| DxPADS | PADS-BPADA-HQDS Composition | Sol in CHCl₃ | mg/min Flow |
| 20 | Control | Yes | 49 |
| 20 | 50-10-40 HQDA | No | small |
| 20 | 50-25-25 HQDA | No | small |

The 50-10-40 terpolymer and the 50-25-25 terpolymer give tough, flexible materials that were insoluble in and unaffected by the common solvents such as chloroform and methylene chloride, yet still had some flow when pressed in a hot press. The terpolymers were too viscous to flow in the capillary plastometer but were extrudable over a controlled range of molecular weight. The terpolymers made in NMP appeared to be more uniform and homogenous then the terpolymers made in ODCB. All of the terpolymers contained 40-60% silicone and accordingly were flame resistant.

Although the above example illustrates only a few of the very many variables which can be used in the practice of the present invention, those skilled in the art know that additional silicone polyimides can be prepared by varying the proportions of the mole % of the organic dianhydrides and the block size of the PADS.

What is claimed is:

1. Melt extrudable solvent resistant silicone polyimides substantially insoluble in chlorinated organic solvents and which have a melt flow rate of less than about 40 mg/min in accordance with ASTMD-1238-79, comprising the condensation product of reaction in a dipolar aprotic solvent of substantially equal molar amounts of para phenylene diamine and organic dianhydride in the form of a mixture consisting essentially of (a) 40-60 mole % of an aromatic anhydride terminated organopolysiloxane having the formula,

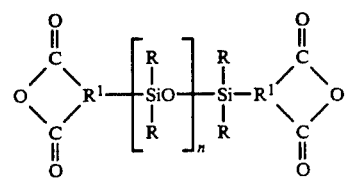

(b) 10-50 mole % of hydroquinone dianhydride and, (c) 10–50 mole % of bis(3,4-dicarboxyphenoxy)phenyl propane dianhydride based on the total moles of organic dianhydride in the mixture of (a), (b), and (c), where R is a $C_{(1-14)}$ monovalent hydrocarbon radical, or a $C_{(1-14)}$ monovalent hydrocarbon radical substituted with the same or different radicals neutral during intercondensation, $R^1$ is a $C_{(6-14)}$ trivalent aromatic organic radical, and n is an integer equal to 1 to about 2000 inclusive.

2. A melt extrudable solvent resistant silicone polyimide in accordance with claim 1, consisting essentially of the condensation product of reaction of para phenylene diamine and a substantially equal molar amount of an organic dianhydride mixture consisting essentially of about 50 mole % of (a), 10 mole % of (b) and 40 mole % of (c) based on the total moles of organic dianhydride in the mixture.

3. A melt extrudable solvent resistant silicone polyimide in accordance with claim 1, consisting essentially of the condensation product of reaction of para phenylene diamine units and a substantially equal molar amount of an organic dianhydride mixture consisting essentially of 50 mole % of (a), 25 mole % of (b) and 25 mole % of (c) based on the total moles of organic dianhydride in the mixture.

4. A melt extrudable solvent resistant silicone polyimide in accordance with claim 1, where R is methyl and $R^1$ is

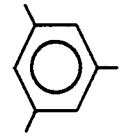

5. A melt extrudable solvent resistant silicone polyimide in accordance with claim 1, where n is 20.

* * * * *